Patented Jan. 30, 1940

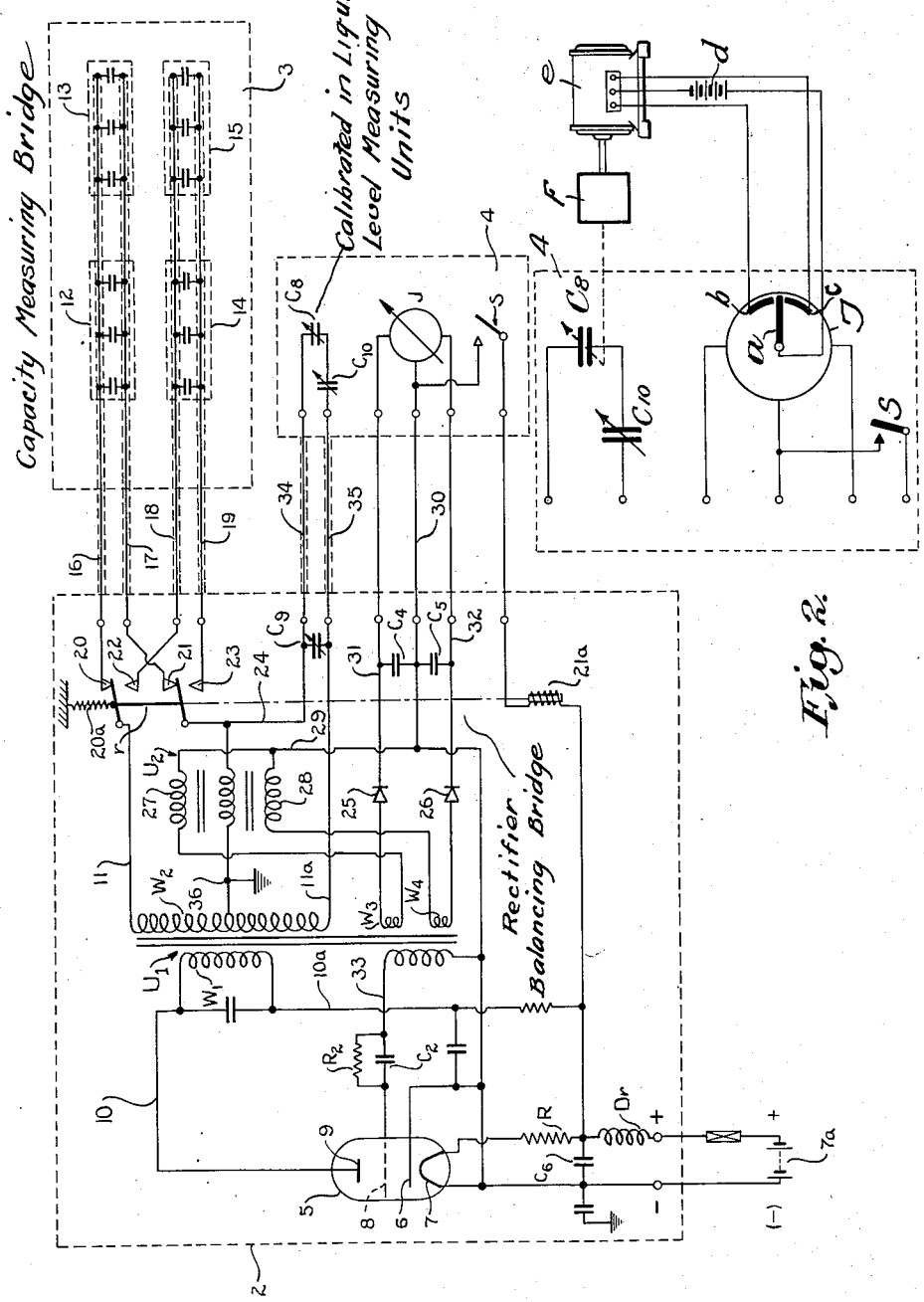
Jan. 30, 1940. E. FREYSTEDT 2,188,628
MEASURING INSTRUMENT
Filed Nov. 26, 1937
INVENTOR.
Erich Freystedt
BY
Stephen Cerstvik
ATTORNEY.

2,188,628

UNITED STATES PATENT OFFICE 2,188,628

MEASURING INSTRUMENT

Erich Freystedt, Berlin-Siemensstadt, Germany, assignor to Siemens Apparate und Maschinen Gesellschaft mit beschrankter Haftung, Berlin, Germany, a corporation of Germany Application November 26, 1937, Serial No. 176,737
In Germany November 27, 1936

8 Claims. (Cl. 73—304)

This invention relates to measuring instruments and more particularly to means for measuring the volume of liquid in a container which is unsteady in space.

Devices heretofore proposed for measuring the volume of liquid in a container wherein the condenser method is employed have measured the capacity of a condenser disposed in the liquid in the form of a sounding device with said liquid acting as the dielectric, such measurement being taken by means of a measuring bridge in cooperation with a dry rectifier bridge fed by an alternating current generator. In this as well as in many other previous arrangements of this character, it has been necessary, in order to produce accurate indications, to use multi-stage thermionic tube amplifiers in addition to special batteries all of which involve a considerable increase in weight of the complete apparatus thus reducing the adaptability thereof for use in vehicles such as aircraft.

One of the objects of the present invention is to provide novel means, which are light in weight, for measuring the volume of liquid in a container which is unsteady in space.

Another object of the invention is to provide novel means for measuring the volume of liquid in a container wherein the condenser method is employed.

A further object is to provide novel means for measuring liquid volume in a container wherein the condenser method is employed and where it is unnecessary to employ therewith heavy electrical equipment.

An additional object is to provide novel condenser means for measuring liquid volume in a container wherein high sensitivity to volume change is obtained.

A further object is to provide novel condenser means for measuring liquid volume in a container wherein a measuring current is employed at a low voltage and a high frequency.

Another object is to provide novel means for liquid volume measurement wherein the volume of liquid in any pair of several tanks may be read from the same scale.

The above and further objects and novel features of the invention will more fully apear when the same is read in connection with the accompanying drawing. It is to be expressly understood, however, that the drawing is for purposes of illustration only and is not intended to define the limits of the invention, reference being had primarily for this latter purpose to the appended claims.

In the drawing:

Fig. 1 is a schematic representation of one embodiment of the present invention, and Fig. 2 is a schematic illustration of automatic means for balancing the bridge.

The form of the invention illustrated in the accompanying drawing, by way of example, is a measuring arrangement for determining the amount of liquid in a container regardless of the attitude of the container. Means are provided for measuring the capacity of a condenser disposed in the liquid wherein the condenser acts as a sounding device and the liquid serves as the dielectric medium. The measured capacity provides a gauge for the amount of liquid in the container. Novel means are provided for causing an alternating current of low voltage and high frequency to flow to said sounding condensers and for comparing the capacity there obtained with a fixed capacity. Variable condenser means are provided for causing the two capacities to agree by adding to or subtracting from the capacity of the sounding condenser in such a manner that the amount so added or subtracted is a measure of the volume of liquid in the container.

One embodiment of the present invention is illustrated in the drawing. In order to better adapt the apparatus for installation, for example, aboard aircraft where limited space is available, it has been subdivided into a portion in housing 2 including a thermionic tube oscillator with measuring bridge and transformer means, a sounding condenser portion 3, and an indicating and control portion 4.

In order to avoid the use of heavy electrical equipment, such as multi-stage amplifiers and large transformers, which heretofore has been employed with apparatus of this character to produce a current of proper characteristics for energizing the sounding condensers, a high frequency low voltage thermionic tube oscillator 5 is provided comprising in the form shown a filament 6 indirectly heated by element 7, a grid 8, and a plate 9. A suitable source of electric energy, as a battery 7a, is connected to element 7 with control resistance R, and coil Dr in series therewith and with control condenser C6 in parallel. The apparatus does not require a separate energy source but may be connected, for example, to the vehicle battery. Tube 5 is in inductive return coupling to the grid circuit which coupling will be more fully described hereinafter. The high frequency low voltage output of thermionic tube 5 is fed to the sounding condenser bank 3 by means of transformer $U_1$ having windings $W_1$ and $W_2$ with leads 10, 10a and 11, 11a, respectively.

In the form shown, the capacity measuring bridge 3 is constituted by four sets of condensers 12, 13, 14, 15, which, for example, are adapted for sounding the four wing tanks of an aircraft. The condensers for each pair of tanks in the same wing may be in parallel and combined into a single sounding group, as group 12, 13 and 14, 15. The condensers of the first group are in parallel with leads 16 and 17, in the second group with leads 18 and 19. Means are provided for energizing one of these groups at a time comprising switch $r$ which is normally held in a position connecting contacts 20, 21 of the first group by means of a spring 20a. A relay 21a connected across battery 7a through a switch $s$ at the control panel 4 is able to overcome the tension of spring 20a and to connect contacts 22, 23 to the energy source, thus energizing the second condenser group 14, 15.

For a purpose to more fully appear hereafter, there is connected across the transformer lead 11a and the sounding condenser output lead 24, the variable condenser $C_9$. In series therewith are variable capacities $C_8$ and $C_{10}$.

Inductively coupled by means of transformer $U_2$ to the sounding condenser circuit is the rectifier bridge circuit which acts in cooperation with fixed capacities connected therewith to provide a reference capacity for comparison to the measured capacity of the sounding condenser group. The rectifier bridge also serves to maintain indications of the greatest possible sensitivity and of accurate phase. Said bridge comprises rectifiers 25, 26 which are respectively connected to one side of windings 27, 28 of transformer $U_2$. Also connected in the rectifier circuit are the windings $W_3$ and $W_4$ of transformer $U_1$. Said windings serve to conduct symmetrically to the rectifier circuits an auxiliary voltage whereby the sum of the auxiliary and measuring voltages acts in one circuit and the difference in the other. To the opposite side of windings 27, 28 of transformer $U_2$, in differential connection with rectifiers 25, 26, is the indicating instrument J. This connection is accomplished by connecting lead 29 to lead 30 which, in turn, is connected to J. Leads 31, 32 are respectively connected to rectifiers 25, 26 and also to instrument J. Between lead 30 and leads 31, 32 there are connected the rectifying capacitors $C_4$ and $C_5$ which act in cooperation with said rectifiers 25 and 26 to establish a fixed reference capacity and to enable a measurement by bridge means of the capacity of the sounding condensers.

It is seen that transformer $U_1$ is in connection by means of lead 33, grid leak $R_2$, and grid condenser $C_2$ with grid 8, thus completing the inductive return coupling from plate 9 through transformer $U_1$. Lead 29 connects transformer $U_2$ to the negative side of battery 7a.

At the control panel 4 is attached the equalizing variable condenser $C_8$ which is calibrated in suitable units for liquid measurement upon a scale, the zero point and the maximum point of which are adjustable by means of the variable adjusting condensers $C_9$ and $C_{10}$. When these points are determined and it is desired to learn the volume of liquid in tank group 12, 13 the condenser capacity therein is balanced in the bridge circuits above mentioned against the rectifier capacity. Lack of agreement will cause a potential difference in the circuit which will cause a displacement of the indicator J. Variable condenser $C_8$ may now be adjusted to restore the indicator to its original reading. The amount of adjustment necessary for $C_8$ will be a measure of the volume and is readable upon the volume scale attached thereto. The use of an opposed bridge with the zero method, automatically compensates for temperature effects which might alter the readings.

Means are provided for compensating for the capacities of leads 16, 17, 18, 19, 34 and 35 which under ordinary circumstances would influence the correct measurement of the capacity of the sounding condensers. Said leads are suitably screened or insulated and the screens connected to housing 2 which serves as ground and by a ground connection to point 36 of the measuring bridge. Thus, the injurious screen capacities lie parallel to the bridge output and, therefore, are capable only of causing a reduced sensitivity of the indications at the control panel but not of causing rectifier errors.

In operation, the switch S is thrown to connect in the measuring circuit the desired group of sounding condensers, for example, group 12, 13. Thermionic tube 5 causes current at low voltage and high frequency to flow through the measuring bridge and sounding condensers by means of transformer $U_1$. The output of the condenser bank is coupled to the rectifier bridge by means of transformer $U_2$. If the capacity existing in the condenser bank or sounding capacitors does not agree with the capacity of the rectifier circuit, a potential difference will exist and will cause the indicating instrument J to be displaced from zero. The equalizing condenser $C_8$ must now be adjusted to bring the capacities of said two circuits into agreement. Said equalizing condenser is provided with a volumetric scale, the upper and lower limits of which, for an empty and a full tank, respectively, are determined by variable condensers $C_9$ and $C_{10}$. When the adjustment and capacity agreement is accomplished, the indicating instrument will be restored to the zero reading and the volume scale at the condenser $C_8$ will register the amount of liquid in the tanks in question.

There is thus provided a novel volume measuring device which is capable of measuring the volume of liquid in a container which is not steady in space. The device is light in weight and avoids the use of heavy supplementary equipment. The indications are extremely sensitive and easy to determine and the apparatus is adapted for indicating upon the same scale the separate volumes in several containers. The apparatus although employing the condenser method for determining volumes eliminates the necessity for multi-stage amplifiers and heavy transformers by employing an oscillator which produces a current of high frequency and low voltage. The device is further well adapted for installation within a limited space.

Although but one embodiment of the invention has been illustrated and described in detail, it is to be expressly understood that the same is not limited thereto. For example, in the form shown, a manual adjustment of condenser $C_8$ is provided, however, automatic means such as illustrated in Fig. 2 may be provided for adjusting $C_8$ to the proper point, in cooperation with the indications of the instrument J. In this figure, instead of setting condenser $C_8$ by hand until indicator J is brought back to zero, apparatus is provided whereby automatic control of $C_8$ is provided. A contact $a$ is carried by the pointer of instrument J and is mounted for movement over contacts b and c. Whenever contact a is moved from its zero position into contact with either contact b or c a circuit is closed to motor e and source d whereby motor e by means of reduction gear f rotates the movable element of condenser C8 until the bridge is balanced and the pointer of instrument J carrying the contact a returns to zero position. Various changes may also be made in the design and arrangement of parts illustrated without departing from the spirit and scope of the invention, as will now be understood by those skilled in the art. For a definition of the limits of the invention, reference will be had primarily to the appended claims.

What is claimed is:

1. In apparatus of the class described, means for causing a current to flow at a high frequency, capacitor sounding means, a fixed capacity, means for causing said current to act upon said capacitor sounding means, means for comparing the capacity of said sounding means with the fixed capacity, and means for bringing said capacities into agreement.

2. In apparatus of the class described, a container, an oscillator, a capacity measuring bridge in said container, a rectifier capacity bridge, current indicating means for said rectifier bridge, means for coupling said bridges, and means for determining the difference in the capacities of said bridges and for determining the volume of liquid in said container in accordance with said difference.

3. In apparatus of the class described, a container, condenser measuring bridge means in said container, means for energizing said condensers, rectifier bridge means coupled to said measuring bridge, indicating means in differential connection with said rectifier bridge and said condenser measuring bridge, and means for causing said indicating means to be displaced in accordance with the capacity in said condenser measuring bridge.

4. In apparatus of the class described, a capacity measuring bridge, a rectifier capacity bridge coupled thereto, a container of liquid, said first-named bridge being disposed in said container, means for comparing the capacities of said bridges, indicating means for determining the volume of liquid in said container in accordance with said comparison, and capacity means for determining the extremities of said indicating means.

5. In apparatus of the class described, a plurality of liquid containers, condenser means in said containers, a predetermined balancing capacity, means for causing the capacities of condensers disposed in said containers to be balanced with said predetermined capacity, and means for determining the volume of liquid in said containers in accordance with the magnitude of said balancing capacity.

6. In apparatus of the class described, a container, capacitor means disposed in said container, a rectifier bridge, means for coupling said bridge and capacitor means, thermionic tube means for energizing said capacitor means and bridge, means for symmetrically feeding an auxiliary current to said rectifier bridge, means for measuring the capacity of said capacitor means, and means for balancing the same against the rectifier bridge capacity and for determining the volume of liquid in said container in accordance therewith.

7. In apparatus of the class described, means for causing a current to flow, a container for liquid, capacitor sounding means in said container, a fixed capacity, means for permitting said current to act upon said capacitor sounding means, means for comparing the capacity of said sounding means with said fixed capacity, means for bringing said capacities into agreement and for measuring the volume of said liquid in accordance with the capacity necessary to cause agreement.

8. In apparatus of the class described, a container, a volume of liquid in said container, a capacitor in said container, a fixed capacitor, means for measuring the capacity of said first-named capacitor and comparing the same to said fixed capacitor, and means for determining said volume in accordance with the difference between said capacities.

ERICH FREYSTEDT.